Reissued July 30, 1929. Re. 17,385

UNITED STATES PATENT OFFICE.

PIERRE BERTHÉLEMY AND HENRY DE MONTBY, OF PARIS, FRANCE.

ALUMINUM ALLOY AND METHOD OF MANUFACTURING THE SAME.

No Drawing. Original No. 1,599,869, dated September 14, 1926, Serial No. 37,573, filed June 16, 1925, and in France May 11, 1925. Application for reissue filed September 15, 1927, Serial No. 219,811.

The present invention has for its subject a new aluminum alloy of which the density is substantially equal to that of aluminum itself but whose mechanical strength is much higher than that of aluminum. This alloy is essentially characterized by the fact that its composition includes copper, manganese, iron and silicon employed in the form of ferro-silicon, tungsten, magnesium, also cadmium, and aluminum, in suitable determined proportions, yielding an alloy which may be subjected to any mechanical treatment such as rolling, drawing, hammering, wire drawing and so forth. Our improved alloy may be even used for casting to produce a superior cast product.

The invention also relates to the process of manufacture of the said alloy, according to which process there is first prepared a "rich alloy" of the body above specified by fusion in a plumbago crucible lined with magnesia and containing a certain quantity of a mixture of wood charcoal, calcium fluoride, oxide of magnesium and arseneous acid, the molten rich alloy thus produced being freed from floating slag and being then run into ingot moulds for subsequent alloying with aluminum in the proportion (variable according to the uses for which the metal is adapted) of 10 to 15 parts by weight of rich alloy to 90 to 85 parts by weight of aluminum. The purpose of using the rich alloy is to facilitate the production of a light and homogeneous alloy in which ingredients are incorporated having a melting point much higher than that of aluminum. We have discovered that if all the different elements or ingredients appearing in our alloys are melted and mixed together in a single crucible that the alloy thus produced is not homogeneous, certain of the ingredients have not been properly intermixed with the others, and other ingredients have completely failed to impart their desirable qualities to the alloy, because of the differences in the melting points of the various ingredients.

Finally the invention has for its object a modification of the process, which modification is more particularly applicable in the case of alloys adapted to be fused, and in which the magnesium and cadmium (this latter body may be replaced by sodium) are only incorporated at the moment when the rich alloy is mixed with the aluminum, this incorporation being made at a temperature not higher than 725° C. As later set forth more fully herein, the incorporation of cadmium substantially increases the resistance of the alloys to oxidation, and this applies to all the alloys set forth in the various formulas incorporated in this specification. However, experience has shown that if cadmium is first introduced into the fused mass, that the cadmium falls to the bottom of the fused mass. If magnesium is added to the fused mass subsequent to the addition of the cadmium, then no direct contact takes place with the magnesium and the cadmium because the magnesium tends to remain upon the top of the fused mass of the bath. Under such circumstances, namely, if the cadmium and the magnesium do not contact, the cadmium is not incorporated uniformly in the alloy because this is produced by the action of the magnesium. Hence, it is highly advantageous to add the cadmium and the magnesium to the fused mass as part of a single step of the method, and under conditions which cause the magnesium to exert the desired action upon the cadmium.

With reference to examples which are given solely as examples of the methods of carrying the invention into effect, there will be described the method of preparation of alloys suitable for various uses. In all cases the rich alloy is prepared by fusing the constituents in a plumbago crucible lined with magnesia and in the bottom of which there are first placed 25 grammes of the following mixture:

| | Grammes. |
|---|---|
| Pulverized beech charcoal | 1000 |
| Natural calcium fluoride | 1000 |
| Oxide of magnesium | 250 |
| Arseneous acid | 10 |

We prefer to use a plumbago crucible lined with magnesia in order to eliminate the incorporation of impurities in the alloy. If the alloy contains certain impurities and particularly iron, it can only be rolled with great difficulty. The powdered mixture above referred to and consisting of charcoal, calcium fluoride, magnesium oxide and arseneous acid, is used to provide a sufficiently powerful reducing action. Although these four ingredients are eliminated from the final product they decompose when heated in the process of manufacture to facilitate the production of a homogeneous alloy.

The crucible is heated in a furnace which enables a regular and constant temperature to be secured. This may be a heavy oil furnace or a furnace for heat recuperation of the Bigot system, for example. When the fusion has been effected, the alloy is agitated for a very long time by means of a rod of carbon in the said retort lined with magnesia (a rod of iron should never be used for this operation). Then the floating powder and slag are removed from the surface of the molten mass, which is then run in small ingots in an ingot mould made of iron lined with magnesia.

The composition of the rich alloy thus prepared varies according to the use to which the final alloy is adapted to be applied.

*Example I.*—For obtaining an alloy adapted to form plates, rods, tubes, wires, sections and so forth, the rich alloy is prepared from the following substances: copper, 40 grammes; manganese, 2 grammes; ferro-silicon, 5.35 grammes, having 55% iron and 45% silicon (i. e. iron 2.95 gms. silicon 2.40 gms.); tungsten, 2 grammes; magnesium, 15 grammes; aluminum, 35.65 grammes.

If desired, 20 grammes of cadmium could be incorporated into the final alloy secured, when this rich alloy is added to aluminum in the proportions later described herein. The addition of the cadmium is particularly advantageous in preparing an alloy intended for casting.

The effect is the same as though the rich alloy above mentioned in Example I had had 20 grammes of cadmium added thereto.

We have discovered that it is highly advantageous to incorporate iron into the alloy by employing ferro-silicon and in particular, ferro-silicon containing more than 50% of iron. The ferro-silicon forms a chemical combination with the other ingredients of the alloy to eliminate the disadvantages resulting when it is attempted to directly unite aluminum with iron. When it is attempted to directly alloy aluminum with iron, the iron often separates in the final alloy. Likewise, we prefer to use ferro-silicon containing more than 50% of iron, because we have discovered that if the silicon is present in excess that this is injurious to the quality of the completed product.

The quantity of rich alloy obtained by fusing the preceding substances in the manner indicated above is alloyed with 900 grammes of pure aluminum (i. e. 99 to 99.5% pure), by melting the hundred grammes of rich alloy and the nine hundred grammes of aluminum and intermixing them.

*Example II.*—The rich alloy for the preparation of a metal adapted for the manufacture of castings of any nature, is obtained by melting the following:—copper, 42 grammes; manganese, 2 grammes; ferro-silicon, 5.35 grammes, having iron 55% and silicon 45% (i. e. iron 2.95 gms. and silicon 2.40 gms.); tungsten, 1 gramme; magnesium, 20 grammes; aluminum, 9.65 grammes.

The eighty grammes of rich alloy thus obtained are combined with 900 grammes of pure aluminum. According to one essential feature of the invention, and to prepare an alloy adapted for casting there are added, at the time of adding the rich alloy to the 900 grammes of aluminum, 20 grammes of cadmium, this addition being for the purpose of decreasing cracks and flaws in the castings. The effect is the same as though the 20 grammes of magnesium had been omitted in preparing a rich alloy according to Example II, and 20 grammes of magnesium and 20 grammes of cadmium had been added when the rich alloy made according to Example II was combined with 900 grammes of pure aluminum. Of course, the cadmium and the magnesium are added under the conditions above mentioned to increase the resistance to oxidation and to facilitate the casting operation.

The magnesium which enters into the formulæ of the rich alloys which have been indicated above (and also in the formula of the third example hereinafter set forth) may be simultaneously melted with the other constituents of the rich alloy, or it may be subsequently added to the alloy, like the cadmium and at the same time that the cadmium is added, namely, at the moment when the rich allow is melted together with the aluminum mass. Although the addition of cadmium to an aluminum alloy imparts various desirable properties to the alloy such as high resistance to oxidation, we have discovered that it is difficult to uniformly incorporate the cadmium in an aluminum alloy, especially in an aluminum alloy of the type specified herein. We have also discovered that the addition of magnesium to an aluminum alloy increases its susceptibility to oxidation. However, by simultaneously adding the magnesium and the cadmium to an aluminum alloy, the magnesium causes the cadmium to be uniformly incorporated throughout the alloy so as to render it homogeneous, to increase its resistance to oxidation, etc. The amount of magnesium thus added simultaneously with the cadmium should be substantially equal to that of the cadmium, to cause the cadmium to be uniformly incorporated in the final alloy, although we do not limit ourselves to such proportions.

In all cases it is advisable, before adding these additional metals, to purify them as otherwise there is danger that the magnesium may be drawn into the slag. On the other hand it is essential to operate at a temperature which does not exceed 725° C. The fusion of the pure aluminum, with the incorporation of the appropriate rich alloy, is preferably effected in a plumbago crucible lined with magnesia and heated in an ordinary coke furnace.

The cadmium may be replaced by an equivalent quantity of sodium. However, for making a non-oxidizable alloy it is preferable to simultaneously add cadmium and magnesium to the alloy.

*Example III.*—A formula similar to the preceding is particularly suitable for the manufacture of engine pistons: copper, 52.50 grammes; manganese, 5 grammes; ferro-silicon, 5.50 grammes, having iron 55% and silicon 45% (i. e. iron 3.03 gms., and silicon 2.47 gms.); tungsten, 1 gramme; magnesium, 20 grammes; aluminum, 46 grammes.

This quantity of rich alloy is incorporated in 850 grammes of pure aluminum with the addition, under the condition specified above, of 20 grammes, of cadmium. The 20 grammes of magnesium called for by the formula of the rich alloy may be added to the alloy simultaneously with the cadmium instead of being previously fused with the other constituents of the rich alloy.

Irrespective of the formula adopted, it is important, in order to obtain products of good quality and constant characteristics, to use only pure metals and start with "cupros," that is, copper alloys of the various ingredients, in the preparation of the rich alloys.

The metal intended to be rolled should be previously heated for one hour at a temperature between 400° and 450° C. After two or three rollings, the sheet should be re-heated under the same conditions, and this treatment is repeated until the required thickness is obtained. The sheet is then annealed at 450° C., and then immersed in a bath of hot water to which 5% of glycerine has been added. Annealing can then be effected at a temperature of 450 to 475° C., and then the plate is allowed to cool slowly in air.

The manufacture of tubes, wires, rods, sections, is effected in the same manner.

Once the mechanical treatment has been completed, it is advisable to allow the metal to mature for from eight to ten days; and from this moment on it possesses all its permanent and desirable qualities.

Rapid artificial maturing of the castings (Examples II and III) can be promoted by subjecting them for one hour to annealing at a temperature of 200 to 250° C, which annealing is followed by immersion in a bath of boiling water to which 5% of glycerine has been added. The same result is obtained by allowing the furnace to cool after annealing for one hour.

The aluminum alloy in the form of castings obtained according to the invention can be readily tempered.

It will be noted that the cadmium is added to the alloy under such conditions that it forms what may be termed a sub-alloy with magnesium to facilitate its uniform intermixture with the other ingredients of the alloy. We prefer to use magnesium for causing the cadmium to be uniformly incorporated in the alloy, because magnesium has a much lower specific gravity than cadmium and has a much higher melting point. Hence, the magnesium tends to remain at the top of the bath so that the cadmium melts at the top of the bath and is intermixed with the magnesium before it becomes uniformly intermixed with the other ingredients of the alloy.

It will be noted that in the specific examples previously mentioned, that the percentage of cadmium present in the final alloy is between one to two per cent of the final alloy formed when the rich alloy is finally alloyed with the relatively pure aluminum.

Tests have shown that when cadmium is incorporated in the alloy in such percentages, that it is present in the form of a solid solution, as shown by micrographic tests and thermal tests. If the quantity of cadmium present is three per cent or less, a light alloy is obtained whose density is equal to or less than three, and the cadmium is present in the form of a solid solution in such an alloy.

In order to have the alloy substantially resistant to oxidation, the minimum quantity of cadmium should be between one-half per cent and one per cent and it is preferred to have the percentage of cadmium at least two per cent, or between two and three per cent for this purpose. If a greater per cent of cadmium is utilized, that is, proportions between three per cent and five per cent, the density of the alloy substantially increases although the alloy still resists corrosion or oxidation. Larger proportions of cadmium can be employed without lowering the resistance to corrosion, but this has the effect of substantially increasing the density of the alloy, because if seven per cent of cadmium is employed, the density is 4.48. The alloys having the higher percentages of cadmium, namely between three per cent and twelve per cent, can be easily cast, have a low co-efficient of friction and resist oxidation.

We have described a preferred embodiment of our invention but it is obvious that numerous changes and omissions could be made therein without departing from the spirit. In particular the claims for the improved alloy hereunto annexed are independent of any particular process for making said alloy.

We claim—

1. A process for the manufacture of an aluminum alloy comprising fusing in a plumbago crucible lined with magnesia and containing a mixture of wood charcoal, calcium fluoride, oxide of magnesium, and arseneous acid, a mixture of copper, manganese, ferro-silicon, tungsten, magnesium, and aluminum, so as to produce a rich alloy, running the rich alloy into ingot moulds, and subsequently mixing the rich alloy with pure aluminum.

2. A process for the manufacture of an alluminum alloy comprising fusing in a plumbago crucible lined with magnesia and containing a mixture of wood charcoal, calcium fluoride, oxide of magnesium, and arseneous acid, a mixture of copper, manganese, ferro-silicon, tungsten, magnesium, and aluminum, so as to produce a rich alloy, removing the floating impurities from the rich alloy, running the rich alloy into ingot moulds, and subsequently mixing the rich alloy with pure aluminum, in the proportion of 10 to 15 parts by weight of rich alloy to 90 to 85 parts by weight of aluminum.

3. A process for the production of an aluminum alloy for the production of castings comprising fusing copper, manganese, ferro-silicon, tungsten, magnesium, and aluminum, in a plumbago crucible lined with magnesia and containing a mixture of wood charcoal, calcium fluoride, oxide of magnesium, and arseneous acid, removing the floating impurities from the rich molten alloy thus obtained, molding the rich alloy, and then mixing it with aluminum, and whilst mixing with the aluminum, adding magnesium and cadmium, this addition being made at a temperature not higher than 725° C.

4. A process for the production of an aluminum alloy for the production of castings comprising fusing copper, manganese, ferro-silicon, tungsten, magnesium, and aluminum, in a plumbago crucible lined with magnesia and containing a mixture of wood charcoal, calcium fluoride, oxide of magnesium, and arseneous acid, removing the floating impurities from the rich molten alloy, molding the rich alloy, and then mixing it with aluminum, and whilst mixing with the aluminum, adding magnesium and sodium, this addition being made at a temperature not higher than 725° C 5. In the art of making an aluminum alloy containing cadmium, that step in the art which consists in adding the cadmium to the other constituents of the alloy while simultaneously adding magnesium to cause the cadmium to be uniformly incorporated in the alloy.

6. In the art of making an aluminum alloy containing cadmium, that step in the art which consists in adding cadmium to the other constituents of the alloy while they are in the molten condition, while simultaneously adding to the molten mass a substantially equal quantity of magnesium to cause the cadmium to be uniformly incorporated in the alloy.

7. An aluminum alloy comprising copper, manganese, iron, silicon, tungsten, magnesium, aluminum, cadmium being also present in the alloy in the form of a solid solute uniformly incorporated in the said alloy, the proportion of cadmium in the said alloy being equal to or greater than one-half per cent.

In testimony whereof we affix our signatures.

PIERRE BERTHÉLEMY.
VTE. HENRY DE MONTBY.